TUNING INDICATOR

Filed Sept. 13, 1967

INVENTOR.

BY EARL L. FINK

Carl H. Synnestvedt
AGENT

United States Patent Office 3,508,520
Patented Apr. 28, 1970

3,508,520
TUNING INDICATOR

Earl L. Fink, Wyndmoor, Pa., assignor to Philco-Ford Corporation, Philadelphia, Pa., a corporation of Delaware Filed Sept. 13, 1967, Ser. No. 667,527
Int. Cl. H03j *1/04*
U.S. Cl. 116—124.4 3 Claims

ABSTRACT OF THE DISCLOSURE

An indicator for tuners or the like including a pair of back lighted, rotative, substantially transparent dials, and provision for selective display of tuning indications present upon the dials.

BACKGROUND OF THE INVENTION

The invention provides an indicator particularly useful in television receivers of the VHF-UHF type, and is especially concerned with a tuning indicator of the kind which includes a pair of knobs disposed to drive portions of a channel selector and each having an associated dial.

It has been known in the prior art to provide tuning indication in either of two frequency channels, and the means for accomplishing such indication has included concentric rotatable dials in which the tuning indication of one dial is observed through an aperture provided in the other dial. Due to the thickness of the dial members, and an axial spacing thereof dictated by mechanical requirements, it as been diffcult to observe the indications of the rearward dial through the aperture in the forward dial, particularly when said rearward dial is viewed from a point of observation off the axis of the dial assembly.

SUMMARY OF THE INVENTION

My invention overcomes the mentioned viewing difficulties encountered in prior art arrangements, through use of novel apparatus including a transparent forward dial having a front surface portion or segment which is frosted, or otherwise roughened, to form a rear projection viewing screen. The arrangement is such that the indicia of the rearward dial, which may for example comprise the UHF dial of a television receiver, are projected upon the frosted or matte-finish segment of the forward (VHF) dial when that segment is rotated to a position in which the apparatus is conditioned for UHF tuning and the segment is illuminated.

The invention is also featured by disposing the translucent frosted segment upon the forward portion of the VHF dial, where its display of UHF indicia lies in a plane substantially coinciding with the plane of the VHF tuning indicia disposed upon that dial, and can be seen without difficulty. This arrangement, together with provision of desirable minimum spacing between the indicia of the rearward dial and that of the forward dial results in defocusing the rearward dial indicia when such indicia are not illuminated, e.g., during VHF operation thereby rendering the indicia of the rearward dial substantially invisible when it is desired to observe the tuning indications of the forward dial.

DESCRIPTION OF THE PREFERRED EMBODIMENT

Figures 1, 2, 3, 4:
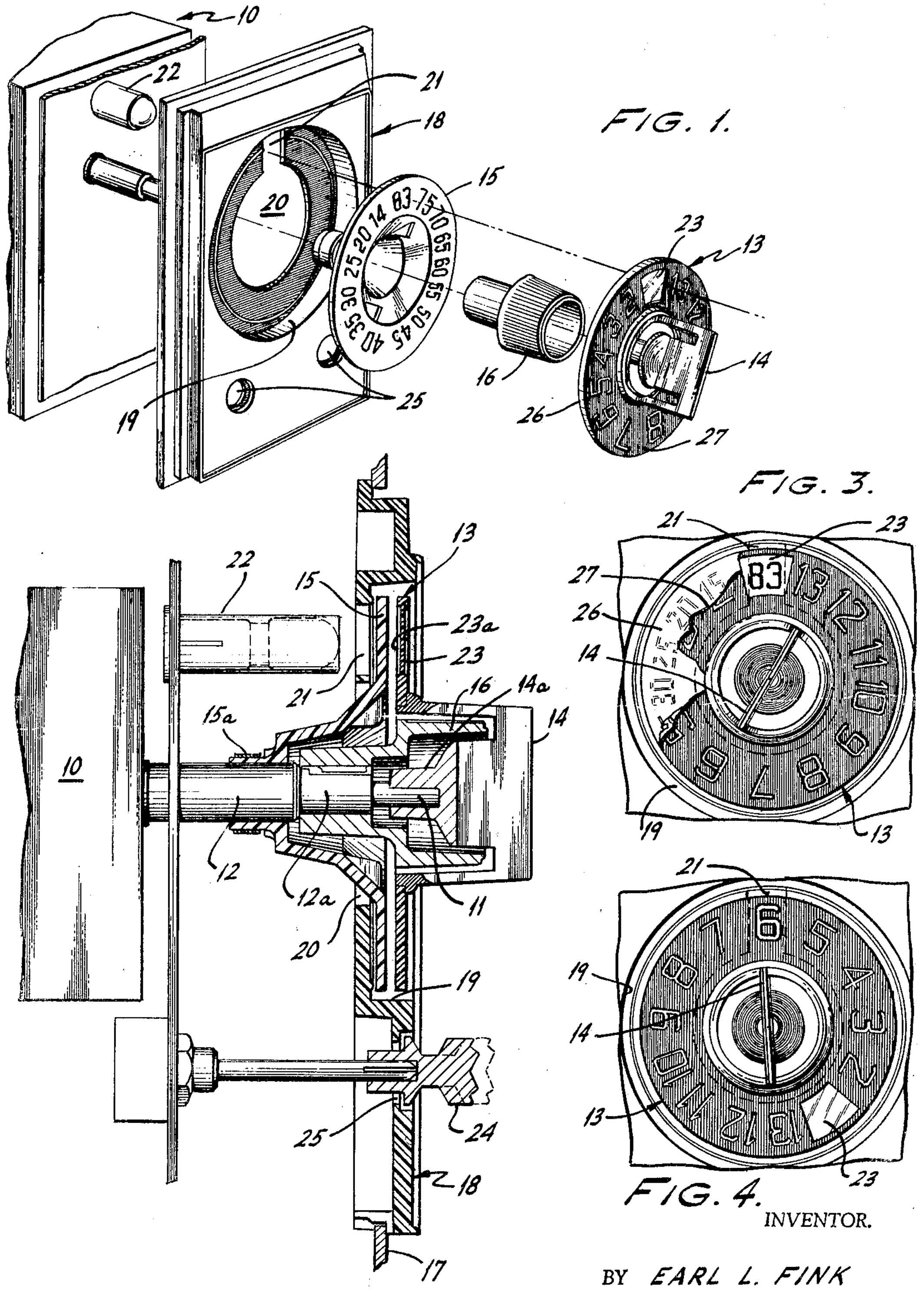
FIGURE 1 is an exploded, perspective illustration of indicating apparatus in accordance with the invention.
FIGURE 2 is a sectional view on an enlarged scale, the view being taken through the vertical mid-plane of the apparatus shown in FIGURE 1.
FIGURE 3 shows the forward, preferably VHF, dial on an intermediate scale. It illustrates the apparatus conditioned for UHF tuning.
FIGURE 4 is a figure similar to FIGURE 3 illustrating the apparatus as it appears when used to indicate VHF tuning.

With detailed reference to the drawing, and first to FIGURES 1 and 2 thereof, the apparatus of the invention is shown as applied to a television channel selector 10 which is of known type including both a VHF tuning section and a UHF tuning section. Since the invention is concerned with apparatus for providing indication of the tuning condition of the channel selector 10, rather than with the selector per se, detailed description of said selector is not required herein. However it is desirable to bear in mind that selector 10 is of the known type in which two tuning sections (usually VHF-UHF) are driven, for both coarse and fine tuning, by three concentric shafts. These shafts appear in the drawing at 11, 12 and 12*a*. Shafts 11 and 12 control coarse tuning, or channel selection, in the two frequency bands. In a channel selector of this type switch and cam devices (not illustrated) are associated with the channel selector 10 and enable the third shaft, 12*a*, to rotate shaft 12 under the UHF coarse tuning condition, and also to serve as means for fine tuning in either band. In the present embodiment, shaft 11 should be understood as being connected to select VHF stations, and shaft 12 as being connected to select UHF stations. As shown in perspective in FIGURE 1, a forward VHF tuning dial 13 is provided with a knob 14 drivingly connected to inner concentric shaft 11, whereas a rearward or UHF tuning dial 15 has a knob 16 which is received within knob 14 and is keyed to the above mentioned shaft 12*a*. As pointed out above, shaft 12*a* either selects UHF channels, by rotating shaft 12, or effects fine tuning in either band.

Referring to FIGURE 2, the apparatus is housed within a cabinet the forward wall of which is shown fragmentarily at 17. An escutcheon plate 18 is secured by any convenient means (not shown) to the forward wall 17 of the cabinet, and is provided with a circular recess 19 centrally apertured at 20 to accommodate the knob and shaft assemblies. The rear wall of recessed portion 19 comprises mask means provided with an aperture 21 defining a reference zone behind which is arranged a lamp assembly 22 adapted to project light through said aperture and upon the rear surface of dial 15. When the apparatus is conditioned for VHF operation light from the lamp 22 is projected through the aperture 21, from whence it passes through the rearward transparent dial 15 and illuminates the numerals of the forward dial 13 as they pass the illuminated aperture 21.

In particular accordance with my invention, when the apparatus is conditioned for UHF operation, light projected through the aperture 21 passes through the transparent UHF dial 15 and projects the opaque numerals thereof upon a frosted or roughened segment 23 of the forward, VHF, dial 13.

Again making particular reference to FIGURE 2, it will be seen that the rearward and forward dials 15 and 13, respectively, are disposed concentrically upon the tuning shafts, with the hub part of dial 15 frictionally secured, at 15*a*, to UHF channel-selecting shaft 12. Knob 14 of the forward VHF dial includes the hub for mounting said dial, the hub being shown at 14*a* and being keyed to a flatted portion of the inner shaft 11 which is connected to operate the VHF tuning section, not shown.

Other controls of the television receiver, for example the "On-Off" volume control 24, project through apertures 25 which are provided in the lower part of the escutcheon 18.

Considering the tuning dials in greater detail, the rearward dial 15 is, as mentioned, transparent and is provided with opaque indicia indicative of UHF channels in the range from 14 to 83. The outer dial 13 is preferably of laminated construction, as appears in FIGURE 3, comprising a transparent rear section 26 of substantial thickness and an opaque forward sheet 27 which appears to good advantage in FIGURE 3 where a portion thereof is shown rolled-up from the surface of the transparent rear section 26. The indicia of the forward dial take the form of apertures formed in the opaque forward sheet 27, with resultant provision of transparent numerals corresponding to VHF channels 2 through 13. The numerals which comprise the indicia of both dials may be brought selectively and progressively into registry with the illuminated aperture 21.

The opaque layer 27 is cut away to expose segment 23 of the forward surface of transparent section 26 of VHF dial 13. This segment 23 lies in a plane coinciding with the VHF numerals and is suitably roughened, as by acid etch, to cause it to constitute a translucent screen upon which the opaque numerals of the UHF dial may be projected from behind the dial assembly. Desirably the rear surface of forward dial 13 is concave in the region of segment 23, as appears at **23*a* in FIGURE 2. This insures a requisite minimum spacing between the screen and the numerals of dial 15. It is preferred that the surface of said concave portion 23*a*** also be etched or frosted.

Taking the numeral 83 of the rear dial 15 as indicative of a desired channel in the UHF band, it will be understood from the drawing that this, or any other station of the UHF band, may be selected when the knob 14 has been rotated to a position in which the rear projection screen segment 23 of dial 13 is in registry with the illuminated aperture 21. In this particular index or reference position rotation of the inner knob 16 actuates the UHF section of the tuner, in known manner, and brings numerals corresponding to the channels in the UHF band progressively into registry with the screen 23, where they appear clearly thereon as seen in FIGURE 3, and lie in the same plane as the channel indications (2 through 13) which appear in the aperture 21 when the apparatus is conditioned for VHF operation. See UHF numeral 83 which has been projected upon the forwardly located screen portion 23 of dial 13, and is in the plane of the forward surface of dial 13. Hence it is visible from any position in front of the receiver.

When it is desired to select channels lying in the VHF band, knob 14 is rotated to actuate the VHF tuning section, bringing transparent numerals 2 through 13 progressively into vertical position where they overlie illuminated aperture 21. In such position light from lamp 22 is projected through transparent dial 15 and through the transparent numerals formed in the opaque forward sheet of dial 13. Due to the axial spacing of the dials, there is considerable defocusing of UHF numerals, during selection of stations in the VHF band, with the result that only the selected VHF numeral is visible when it overlies the light source. The apparatus is shown in FIGURE 4 as having been tuned to VHF channel 6. In this position of adjustment, it will be noted that UHF screen segment 23 no longer overlies the illuminated aperture 21, whereas the VHF numeral 6 of the forward dial does overlie said aperture and is illuminated by light projected through the aperture.

What is claimed is:

1. A tuning or position indicator, comprising: a dial assembly including a pair of dials disposed in general parallelism, one behind the other with respect to a position of visual observation; means mounting said dials for rotation about a common axis; mask means defining a reference zone and disposed to that side of said dial assembly opposite to said position of visual observation, said dials being so positioned that rotation thereof moves different angular portions thereof into registry with said reference zone; the rearward one of said dials being substantially transparent and having substantially opaque indicia thereon; the forward one of said dials being substantially opaque with transparent indicia thereon and being provided with a translucent portion comprising a through-projection screen disposed in the general plane of the indicia of said forward dial and movable into registry with said zone as said forward dial is rotated; and means defining a source of light positioned and directed to provide illumination in said zone effective to back-light the indicia of said dials as they move into registry with said zone, indicia of the forward dial being illuminated by light from said source passing through the transparent rearward dial and visible from said position of visual observation when said indicia of the forward dial is positioned in registry with said zone, and indicia of said rearward dial being illuminated by said source of light and projected and displayed upon said translucent screen portion of the forward dial for viewing from said position of visual observation when said screen portion has been moved into registry with said zone.

2. Apparatus in accordance with claim 1, and further characterized in that the screen portion of said forward dial takes the form of a frosted or matte surface provided upon a segment of said dial.

3. Apparatus in accordance with claim 2 and further characterized in that said surface is provided upon the front portion of the forward dial.

References Cited

UNITED STATES PATENTS

| | | | |
|---|---|---|---|
| 2,907,298 | 10/1959 | Steinke | 116—124.4 |
| 2,909,934 | 10/1959 | Meadows | 74—10.45 |
| 3,162,054 | 12/1964 | Grossenheider et al. | 74—10.6 |
| 3,181,497 | 5/1965 | Tompson | 116—124.4 |
| 3,285,078 | 11/1966 | Siebold | 74—10.54 |
| 3,370,473 | 2/1968 | Fisher | 74—10.45 |
| 3,376,846 | 4/1968 | Sekinguchi et al. | 116—124.1 |
| 3,393,657 | 7/1968 | Fukunishi | 116—124.1 |
| 3,428,021 | 2/1969 | Kuhl et al. | 325—464 XR |

LOUIS J. CAPOZI, Primary Examiner

U.S. Cl. X.R.

74—10.45; 325—464; 334—86